Sept. 17, 1935.  J. A. REINHARDT ET AL  2,015,042
SELF STARTING SYNCHRONOUS MOTOR
Filed Sept. 10, 1934    2 Sheets-Sheet 1
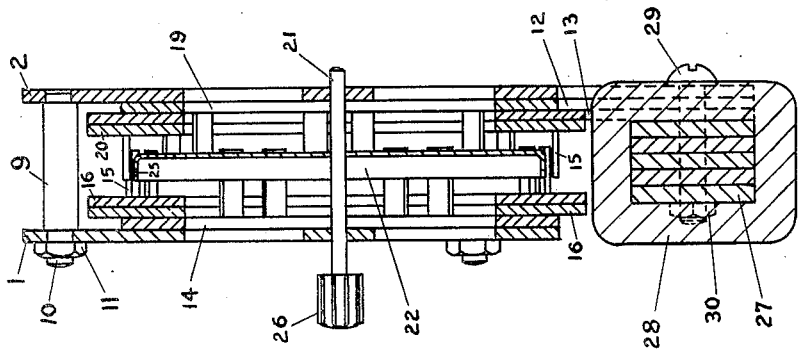
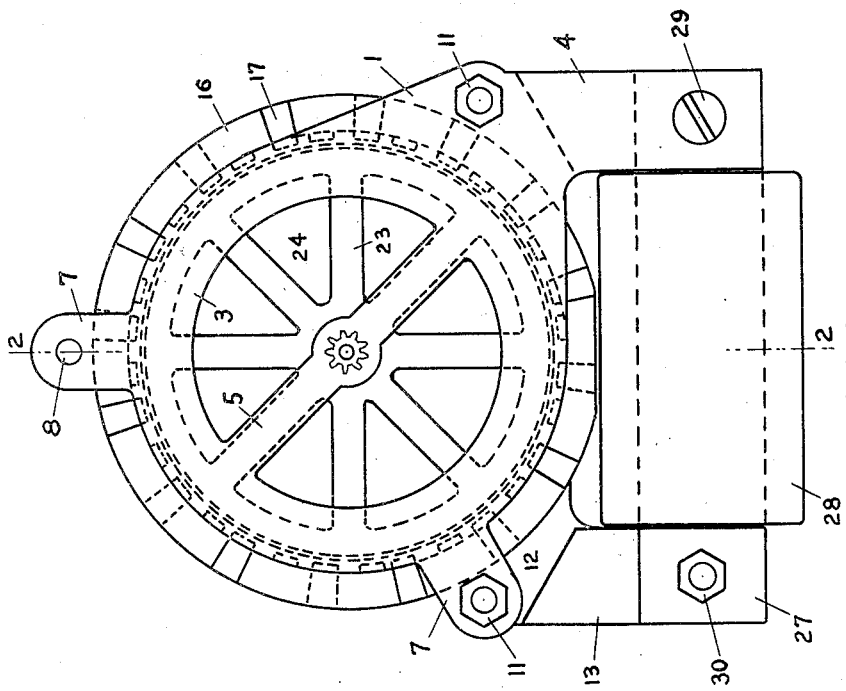
INVENTORS.
Joseph A. Reinhardt
BY Oscar H. Kaminky
ATTORNEY.

Sept. 17, 1935.   J. A. REINHARDT ET AL   2,015,042
SELF STARTING SYNCHRONOUS MOTOR
Filed Sept. 10, 1934   2 Sheets-Sheet 2
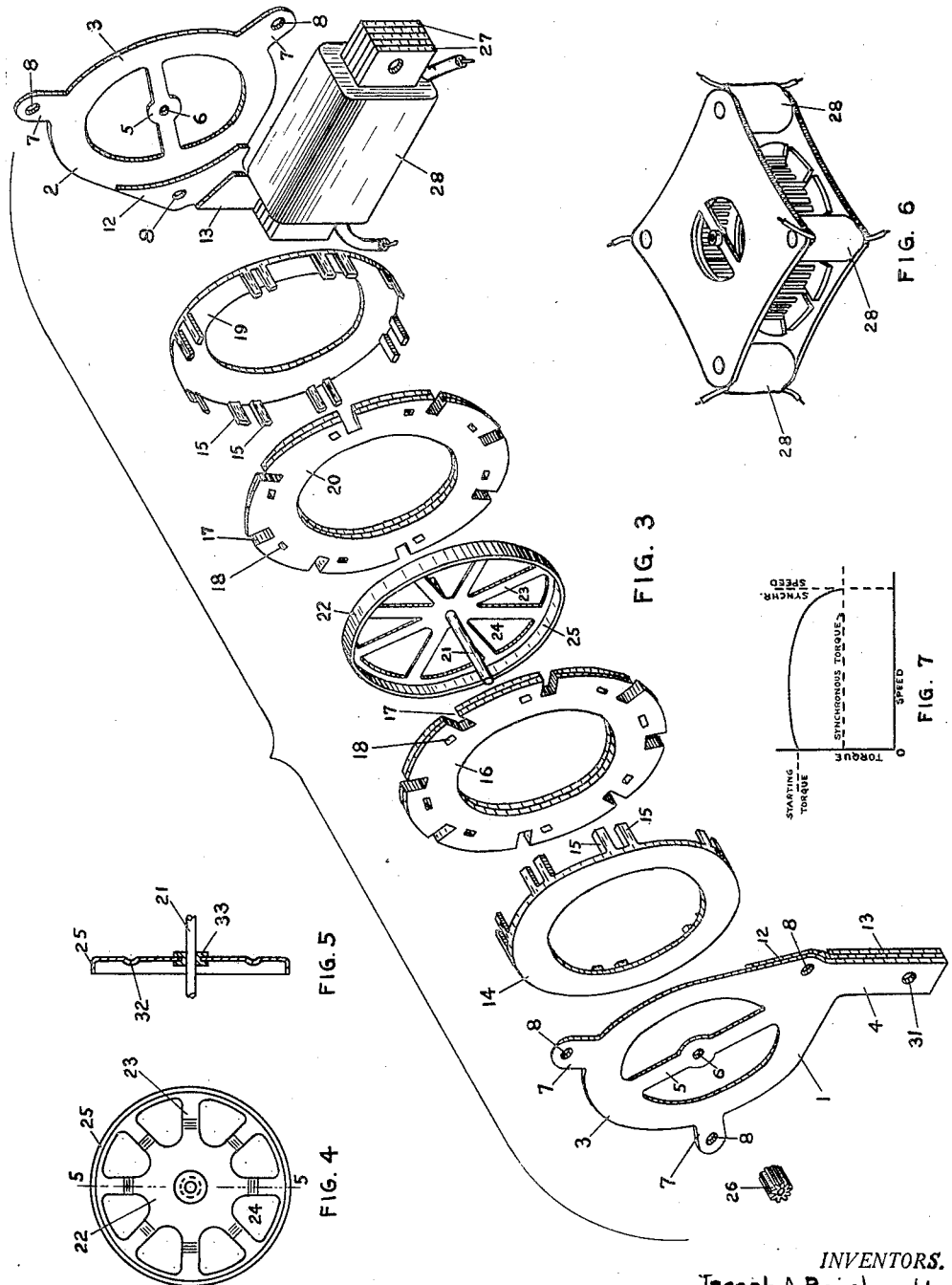
INVENTORS.
Joseph A. Reinhardt
Oscar H. Kaminky
BY Andrew J. Neureuther
ATTORNEY.

Patented Sept. 17, 1935

2,015,042

UNITED STATES PATENT OFFICE 2,015,042

SELF-STARTING SYNCHRONOUS MOTOR

Joseph A. Reinhardt and Oscar H. Kaminky, Peru, Ill., assignors to Western Clock Company, Peru, Ill., a corporation of Illinois Application September 10, 1934, Serial No. 743,384

10 Claims. (Cl. 172—275)

The object of our invention is the production of a hysteresis motor having a novel field structure which provides a rotating magnetic field which co-acts with a novel rotor mounted therein whose characteristics include a high hysteresis coefficient and a high magnetic retentivity.

The object of the combination of rotor and field is to produce a motor in which a tremendous torque is developed by the rotor when acting in the rotating field. All prior motors of this type thus far developed have only a comparatively low torque from a rest position. The torque of this motor in a rest position is actually greater than the torque attained when it is running at synchronous speed.

A further object of our invention is the production of a motor such that when its rotor is loaded above its synchronous torque the speed drops to a fairly constant value and the torque at this speed is appreciably higher than the synchronous torque. For instance, a curve plotted with speed and torque as coordinates will show definite values for torque at definite speeds, with the torque increasing with each decreased speed. If the torque required is slightly above that delivered at synchronous speed the motor will slow down to that point at which the torque delivered is equal to the braking effect of the load. As soon as this applied brake load is released the rotor will again resume synchronous speed thus showing that the motor of our invention has an extremely high self-starting effort enabling the motor to readily start with its full synchronous load.

A further object of our invention is the production of a small self-starting synchronous motor which has a very high efficiency of conversion of electrical energy to mechanical energy as compared to the small slow speed synchronous motors produced before our invention, particularly in starting efforts under load, making it possible to apply this slow speed motor to timing mechanisms which demand considerable power with less gear reductions than used prior to our invention.

A further object of our invention is in the construction of a slow speed motor using a solenoid type of coil for excitation which has a greater efficiency and a more excellent performance than motors developed before our invention herein set forth. It allows for wider variation in coil design for various applications. It is further possible to add a second solenoid coil or additional coils similar to the one illustrated which construction increases the efficiency as well as multiplies the available power produced.

A further object of our invention is the production of a synchronous motor such that a bell can be operated by the motor solenoid by adding an armature across the pole without disturbing its synchronous speed and operation and still have a surplus of motor power for operating clutches and other mechanisms desired to be operated after current interruptions have occurred.

A further object of our invention is the production of a cup rotor construction which is such that the extra power indicated above is available.

A further object of our invention is the production of a field structure that can utilize the hysteresis ring or other hysteresis rotors already known in the art and secure therewith a considerably higher starting torque and better synchronous operation than that produced by fields in use before our invention.

A further object of our invention is the production of a cup-shaped rotor wherein the synchronous torque is substantially affected by changing the width of that portion of the rim lying in the plane at right angles to the shaft and in which the starting torque is substantially affected by changing the thickness of the cylindrical portion of the rim.

A further object of our invention is the production of a slow speed motor whose field structure is such that a rotating field is provided by both halves of the said field structure. This is made possible by shading one of each pair of polar projections in both halves of the said field structure. The production of this design is simple because the field structure is made of stampings which are duplicated in both halves.

A further object of our invention is the production of a slow speed motor which is comparatively thinner than slow speed motors made before our invention. This is extremely desirable for clock mechanisms and the like because it makes smaller sized clocks possible.

A further object of our invention is the production of a slow speed motor having rotor shaft bearings which are on the outside of the intense magnetic field and away from the heating effect of the coil and core, which heating effect seriously handicaps the motors made before our invention.

A further object of our invention is the production of a rotor that will retain its required shape and accuracy during the process of manufacturing necessary to produce same and further that will be accurately and concentrically mounted on the shaft to which it is fastened.

We accomplish these and the other objects that are attained by the means described herein and shown in the accompanying drawings in which:

Fig. 1 is an enlarged front view of our motor.

Fig. 2 is a sectional right side view of the same along a line 2—2 of Fig. 1.

Fig. 3 is an exploded perspective view of the essential parts of our motor, shown in their proper relation along the axis of the rotor shaft.

Fig. 4 is a front view of a modification of the rotor of our motor.

Fig. 5 is a sectional view of the same along a line 5—5 of Fig. 4.

Fig. 6 is a perspective view of another form of our motor using a multiplicity of exciting or field coils.

Fig. 7 is a curve illustrating the torque-speed characteristics of the motor.

Similar numerals represent the same parts throughout the several views.

In the drawings 1 represents the front stator plate and 2 the rear stator plate of our motor, which plates also serve as a part of the frame of said motor.

Plates 1 and 2 each comprise a circular portion 3 with the projection 4 as shown, and the web member 5, in which the aperture 6 is centrally located for the bearings of the rotor shaft 21. Plates 1 and 2 which are made of magnetic material have the projections 7 and the apertures 8 into which apertures the pillars 9 pass to serve to hold the plates together in proper relation to form the frame of the motor. The pillars 9 are fixed in the apertures 8 of the plate 2 as shown in Fig. 2 and the threaded ends 10 of said pillars 9 project through the apertures 8 of plate 1. The nuts 11 are screwed thereon to hold said plates 1 and 2 together.

Adjacent to, and on the inner side of projection 4 of plate 1 are attached the auxiliary stator plates 12 and 13. Similar auxiliary stator plates 12 and 13 are similarly located on the inner side of projection 4 of plate 2. The pole piece member 14, having a plurality of spaced pairs of salient poles 15 as shown, is mounted on and fastened to the inner side of plate 1 and is concentrically located with respect to aperture 6 of plate 1. The shading coil member 16 made of good conducting material preferably copper, having a plurality of slots 17 and apertures 18, is concentrically mounted on the pole piece member 14 in such manner, that one salient pole of each pair of salient poles 15 enter said slots 17 and the other salient pole of said pair of salient poles lies in the aperture 18. Said pole piece member 14 and shading coil member 16 are fastened to stator plate 1 in the relation above described by means of rivets (not shown). A further pole piece member 19 and shading coil member 20 (similar to members 14 and 16 respectively) are similarly and concentrically mounted on stator plate 2 so that the pairs of salient poles on pole piece 19 are located between the pairs of salient poles from pole piece 14 and point from each pole piece toward the opposing pole piece, as shown.

Journalled in apertures or bearings 6 of stator plates 1 and 2 is the rotor shaft 21, to which is fixed the rotor 22. Said rotor 22 consists of the hub shown (see Fig. 2) having a plurality of radial spokes 23, with corresponding apertures 24 between said spokes and a peripheral ring 25. Said rotor is really formed from a cup shaped member of magnetic material the side of the cup being the peripheral ring 25 which ring is preferably reenforced by leaving the part of the bottom of the cup adjacent to the ring 25 and between the spokes 23 remain with the ring. This not only helps the rotor to maintain its shape when the rotor is hardened to give it a high hysteresis coefficient and a high magnetic retentivity or remanence but enables us to produce a motor having a very high starting torque as well as high torque at synchronous speed. Said rotor 22 is located on the rotor shaft 21 between the shading coil member 16 and 20 and in the field of the pairs of salient poles 15 of both pole piece members 14 and 19.

The pinion 26 is mounted on one end of the rotor shaft 21, as shown.

Between auxiliary stator plates or pole pieces 13 of plates 1 and 2 respectively, is mounted the magnetic core 27, around which is wound the coil 28 through which the alternating current passes to energize and operate the motor. Said core 27 is fastened to each of the auxiliary stator plates 13 by means of the bolts 29 and nuts 30, said bolts 29 passing through the aperture 31, common to stator plates 1 and 2 and also to both sets of auxiliary stator plates 12 and 13.

In the modified rotor 22 shown in Figs. 4 and 5, the radial members or spokes 23 have pressed therein the curved protuberances 32 as shown in Fig. 5, the function of said protuberances 32 being to absorb the distorting strains in the heat treatment of the rotor, and thus preserve the accuracy of the peripheral ring 25. As a further assurance that the rotor ring 25 will be accurately concentrically located in relation to the shaft, said ring is accurately held in a suitable die-head together with the shaft and then the parts soldered or fastened together by means of casting metal as indicated at 33.

In operation when an alternating current is put through the coil 28 a strong shifting or rotating magnetic field is set up in each pair of salient poles which set up the corresponding poles in the rotor which has a high hysteresis coefficient and a high magnetic retentivity so that the rotor due to its large starting torque will almost instantly come up to its synchronous speed and produce a surplus of available power and continue to rotate at this speed. When loaded beyond its synchronous torque capacity the rotor will continue to rotate at a lower speed. If the load is increased still more the rotor speed will be reduced further until the load gets above its starting torque when the rotor will stop. Our motor will run at the same reduced speed for each given load above its synchronous load and not decrease in speed as rapidly with the increased over-load as the motors in use did before our invention. This makes it specifically valuable for the operation of clocks where it is desirable to operate at times an alarm mechanism, or as in case of the construction of electric clocks that will continue to keep time during current interruptions where it is necessary to operate clutches of various kinds when the current flows again. Our invention enables us to produce a very small motor to handle the larger load required by these devices which is extremely valuable for the production of electric clocks, time keeping devices for electric meters and the like.

The curve shown in Fig. 7 illustrates the improved speed-torque characteristics found in this motor which are not so markedly exhibited by the motors made previous to our invention. The torque at rest or in a stalled position is shown to be greater than the torque at synchronous speed. The torque is also higher at low intermediate speeds thus allowing the motor to carry safely any power load under which it will start. As the speed increases the power output becomes greater so that the torque required for a given power load becomes less, thus allowing the motor to reach synchronous speed. It becomes evident then that we have produced a motor whose characteristics approach those of a constant power motor.

It is evident that the construction of our motor is simple and such that it can be readily built up by power presses and punch dies making it very inexpensive to produce.

It will be understood, of course, that while we have here shown one form of our invention, we do not wish to limit our invention to the form shown, but wish to have it taken in a sense illustrative of any and all forms of our invention that come fairly within the scope of the appended claims.

We claim:

1. In a self-starting synchronous motor, a stator comprising a core of magnetic material, a stator coil mounted on said core, opposing pole pieces of magnetic material each having an aperture mounted on each end of said core and being so positioned that said core is offset to one side of said apertures, a plurality of pairs of salient poles circumferentially and concentrically disposed adjacent to said aperture and extending inwardly toward the opposing pole piece, the pairs of salient poles on one pole piece alternating with the pairs of salient poles on the opposing pole piece, said pairs of salient poles lying substantially in the same cylindrical surface and means associated with each pair of salient poles for producing a rotating magnetic field in combination with a rotor comprising a cup-shaped member of magnetic material having a substantial amount of remanence and a plurality of spokes formed in the bottom thereof with a substantial ring of metal adjacent to the edge of the cup, a shaft centrally disposed to the edge of said cup and means for fastening said cup-shaped member on said shaft.

2. In a self-starting synchronous motor, a stator comprising a core of magnetic material, a stator coil mounted on said core, opposing pole pieces of magnetic material each having an aperture mounted on each end of said core and being so positioned that said core is offset to one side of said apertures, a plurality of pairs of salient poles circumferentially and concentrically disposed adjacent to said aperture and extending inwardly toward the opposing pole piece, the pairs of salient poles on one pole piece alternating with the pairs of salient poles on the opposing pole piece, said pairs of salient poles lying substantially in the same cylindrical surface and means associated with each pair of salient poles for producing a rotating magnetic field in combination with a rotor comprising a cup-shaped member of magnetic material having a substantial amount of remanence and a plurality of spokes formed in the bottom thereof with a substantial ring of metal adjacent to the edge of the cup, means associated with said spokes for equalizing the strain on the edge, a shaft centrally disposed to the edge of said cup and means for fastening said cup-shaped member on said shaft.

3. In a self-starting synchronous motor, a stator comprising a core of magnetic material, a stator coil mounted on said core, opposing pole pieces of magnetic material each having an aperture mounted on each end of said core and being so positioned that said core is offset to one side of said apertures, a plurality of pairs of salient poles circumferentially and concentrically disposed adjacent to said aperture and extending inwardly toward the opposing pole piece, the pairs of salient poles on one pole piece alternating with the pairs of salient poles on the opposing pole piece, said pairs of salient poles lying substantially in the same cylindrical surface and means associated with each pair of salient poles for producing a rotating magnetic field in combination with a rotor comprising a cup-shaped member of magnetic material having a substantial amount of remanence and a plurality of spokes formed in the bottom thereof with a substantial ring of metal adjacent to the edge of the cup, means associated with said spokes for equalizing the strain on the edge, a shaft centrally disposed to the edge of said cup and means for fastening said cup-shaped member on said shaft, said means comprising a metal hub cast on the shaft and on the inner end of said spokes.

4. In a self-starting synchronous motor, a stator comprising a plurality of cores of magnetic material, stator coils mounted on each of said cores, opposing pole pieces of magnetic material each having an aperture mounted on the opposite ends of each of said cores and being so positioned that each of said cores is offset to one side of said apertures, each pole piece comprising a plurality of pairs of salient poles circumferentially and concentrically disposed around said aperture and extending inwardly toward the opposing pole piece, the pairs of salient poles on one pole piece alternating with the pairs of salient poles on the opposing pole piece and said pairs of poles lying substantially in the same cylindrical surface.

5. In a self starting synchronous motor, a stator comprising a core of magnetic material, a plurality of pole pieces each having an aperture, one of each of which pole pieces is mounted on each end of said core and being so positioned that said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said poles lying substantially in the same cylindrical surface and a stator coil mounted on said core between said pole pieces.

6. In a self starting synchronous motor, a stator comprising a core of magnetic material, a plurality of pole pieces each having an aperture one of each of which pole pieces is mounted on each end of said core and being so positioned that said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said salient poles lying substantially in the same cylindrical surface and having a substantial air gap between the pairs of salient poles, and a stator coil mounted on said core between said pole pieces.

7. In a self starting synchronous motor, a stator comprising a core of magnetic material, a plurality of pole pieces each having an aperture, one of each of which pole pieces is mounted on each end of said core and being so positioned that the said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said salient poles lying substantially in the same cylindrical surface, a stator coil mounted on said core between said pole pieces and means for producing a shifting magnetic field in each pair of salient poles.

8. In a self starting synchronous motor, a stator comprising a core of magnetic material, a plurality of pole pieces each having an aperture one of each of which pole pieces is mounted on each end of said core and being so positioned that said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said salient poles lying substantially in the same cylindrical surface and having a substantial air gap between the pairs of salient poles, a stator coil mounted on said core between said pole pieces, and means associated with each pair of salient poles for producing a rotating magnetic field in combination with a rotor co-acting with said magnetic field.

9. In a self starting synchronous motor, a stator comprising a core of magnetic material, a plurality of pole pieces each one having an aperture, one of each of which pole pieces is mounted on each end of said core and being so positioned that said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said salient poles lying substantially in the same cylindrical surface, a stator coil mounted on said core between said pole pieces, means associated with each pair of salient poles for producing a rotating magnetic field, in combination with a rotor formed from magnetic material having a high hysteresis coefficient and a high magnetic retentivity.

10. In a self starting synchronous motor, a stator comprising a core of magnetic material, a plurality of pole pieces each having an aperture one of each of which pole pieces is mounted on each end of said core and being so positioned that said core is offset to one side of said apertures, a plurality of pairs of salient poles circumferentially and concentrically disposed adjacent to said aperture on each of said pole pieces each pair extending inwardly toward the opposing pole piece, the pairs of salient poles on one pole piece alternating with the pairs of salient poles on the opposing pole piece, all of said salient poles lying substantially in the same cylindrical surface and having a substantial air gap between the pairs of salient poles, a stator coil mounted on said core between said pole pieces, and means associated with each pair of salient poles for producing a rotating magnetic field, in combination with a rotor formed from magnetic material having a substantial amount of remanence in the surface adjacent to the salient poles.

JOSEPH A. REINHARDT.
OSCAR H. KAMINKY.